(12) United States Patent
Chen

(10) Patent No.: US 10,959,385 B1
(45) Date of Patent: Mar. 30, 2021

(54) DIGITAL WATER TIMER

(71) Applicant: Chin-Yuan Chen, Changhua (TW)

(72) Inventor: Chin-Yuan Chen, Changhua (TW)

(*) Notice: Subject to any disclaimer, the term of this patent is extended or adjusted under 35 U.S.C. 154(b) by 0 days.

(21) Appl. No.: 16/598,157

(22) Filed: Oct. 10, 2019

(51) Int. Cl.
| | |
|---|---|
| *A01G 25/16* | (2006.01) |
| *F16K 31/08* | (2006.01) |
| *F16K 31/40* | (2006.01) |
| *E03B 7/04* | (2006.01) |
| *E03B 7/07* | (2006.01) |
| *G09G 3/3233* | (2016.01) |
| *E03C 1/04* | (2006.01) |
| *F16K 31/48* | (2006.01) |
| *E03C 1/05* | (2006.01) |
| *B05B 12/08* | (2006.01) |

(52) U.S. Cl.
CPC ......... *A01G 25/165* (2013.01); *A01G 25/162* (2013.01); *B05B 12/082* (2013.01); *E03B 7/04* (2013.01); *E03B 7/071* (2013.01); *E03C 1/04* (2013.01); *E03C 1/055* (2013.01); *E03C 1/057* (2013.01); *F16K 31/084* (2013.01); *F16K 31/404* (2013.01); *F16K 31/48* (2013.01); *G09G 3/3233* (2013.01); *Y10T 137/8158* (2015.04); *Y10T 137/86389* (2015.04)

(58) Field of Classification Search
CPC .. A01G 25/162; A01G 25/165; B05B 12/082; E03B 7/04; E03B 7/071; E03C 1/04; E03C 1/055; E03C 1/057; F16K 31/084; F16K 31/404; F16K 31/48; G09G 3/3233; Y10T 137/8158; Y10T 137/86389
See application file for complete search history.

(56) References Cited

U.S. PATENT DOCUMENTS

| | | | | |
|---|---|---|---|---|
| 3,989,066 A | * | 11/1976 | Sturman | A01G 25/162 137/624.2 |
| 4,592,505 A | * | 6/1986 | Bruninga | A01G 25/16 137/624.18 |
| 4,807,664 A | * | 2/1989 | Wilson | A01G 25/165 137/624.11 |
| 5,169,117 A | * | 12/1992 | Huang | F16K 31/086 251/30.01 |
| 5,428,350 A | * | 6/1995 | Kurcbart | G06F 1/1679 340/7.63 |
| 5,599,003 A | * | 2/1997 | Seemann | H01F 7/124 251/129.2 |

(Continued)

*Primary Examiner* — Matthew W Jellett
(74) *Attorney, Agent, or Firm* — Che-Yang Chen; Law Office of Michael Chen

(57) ABSTRACT

A digital water timer may include a main body, a water valve, a locating base, a driving base, and a timer. The main body has a water inlet and a water outlet, and a valve tube protrudes from a lateral side of the main body. The water valve connected to the main body is controlled by the timer to achieve on/off operation of channels inside the main body. The locating base is secured on the main body, and the driving base is adapted to have rotation relative to the locating base and be secured at a specific position after rotated. The timer installed in the driving base comprises a display panel and an operation interface which are exposed externally for operation. The driving base with the timer is rotated relative to the locating base, and the display panel is adjusted as needed to provide an optimal view for operation.

7 Claims, 11 Drawing Sheets

(56) References Cited

U.S. PATENT DOCUMENTS

| | | | |
|---|---|---|---|
| 6,337,635 B1* | 1/2002 | Ericksen | A01G 25/165 |
| | | | 137/624.11 |
| 6,547,211 B2* | 4/2003 | Roman | F16K 31/402 |
| | | | 251/129.15 |
| 9,885,425 B2* | 2/2018 | Morozumi | F16K 31/402 |
| 10,544,876 B2* | 1/2020 | Chen | F16K 27/12 |
| D886,645 S * | 6/2020 | Chen | D10/40 |

* cited by examiner

DIGITAL WATER TIMER

FIELD OF THE INVENTION

The present invention relates to a water timer and more particularly to a digital water timer that enables its display panel to be adjusted in angles.

BACKGROUND OF THE INVENTION

Referring to FIGS. 10 and 11, a conventional water timer comprises a water valve (60) and a timer (70). The water valve (60) has a water inlet (61) and a water outlet (62), and an electromagnetic solenoid (63) is formed at a lateral side of the water valve (60). The electromagnetic solenoid (63) is electrically connected to the timer (70) so as to control on/off operation of the water valve (60). The timer (70) is installed on the water valve (60) to provide power supply to the electromagnetic solenoid (63). Moreover, the timer (70) comprises a main body (71) which firmly covers and is connected to the electromagnetic solenoid (63), and the main body (71) has a solar panel (72), a display panel (73), and an operation interface (74) thereon. When in use, the water valve (60) is installed between watering pipes, and a user can set up the duration and interval of automatic sprinkling through the operating interface (74) and read the actual value through the display panel (73).

However, the conventional digital water timer has following disadvantages: the timer (70) with the display panel (73) is secured on the water valve (60) and cannot be rotated relative to the water valve (60), and the display panel (73), which usually is a LCD, has its limited in visual angles, so that the water timer is inconvenient to use when the display panel (73) is unable to rotate and adjust as needed and is easily restricted by factors such as light direction and terrain. Therefore, there remains a need for a new and improved design for a digital water timer to overcome the problems presented above.

SUMMARY OF THE INVENTION

The present invention provides a digital water timer which comprises a main body, a water valve, a locating base, a driving base, and a timer. The main body has a water inlet and a water outlet which are connected to two water tube respectively. A valve tube protruding from a lateral side of the main body is located between the water inlet and the water outlet, and the water valve is connected to the main body through the valve tube. The water valve is controlled by the timer to achieve on/off operation of channels inside the main body. The locating base is secured on the main body, and the water inlet, the water outlet and the valve tube are configured to protrude out of the locating base respectively. The driving base is pivotally connected to the locating base at the position of the valve tube, and the driving base is adapted to have rotation relative to the locating base and be secured at a specific position after rotated. The timer installed in the driving base comprises a display panel and an operation interface which are exposed externally for operation. The timer is driven when the driving base is rotated relative to the locating base, so that the display panel is adapted to be adjusted as needed to provide an optimal view for operation.

Comparing with conventional water timer, the present invention is advantageous because: (i) the driving base together with the timer and the display panel can be pivotally rotated relative to the locating base and secured at a position having an optimal view for operation, which enables the display panel to be used as needed under different conditions; (ii) the timer can be rotated to a vertical angle to enable a user to pat the dust off the display panel easily; and (iii) the driving base with the display panel can be adjusted to a position having an optimal view for operation both when the main body is positioned vertically and when the main body is positioned horizontally.

DETAILED DESCRIPTION OF THE INVENTION

Figure 1:
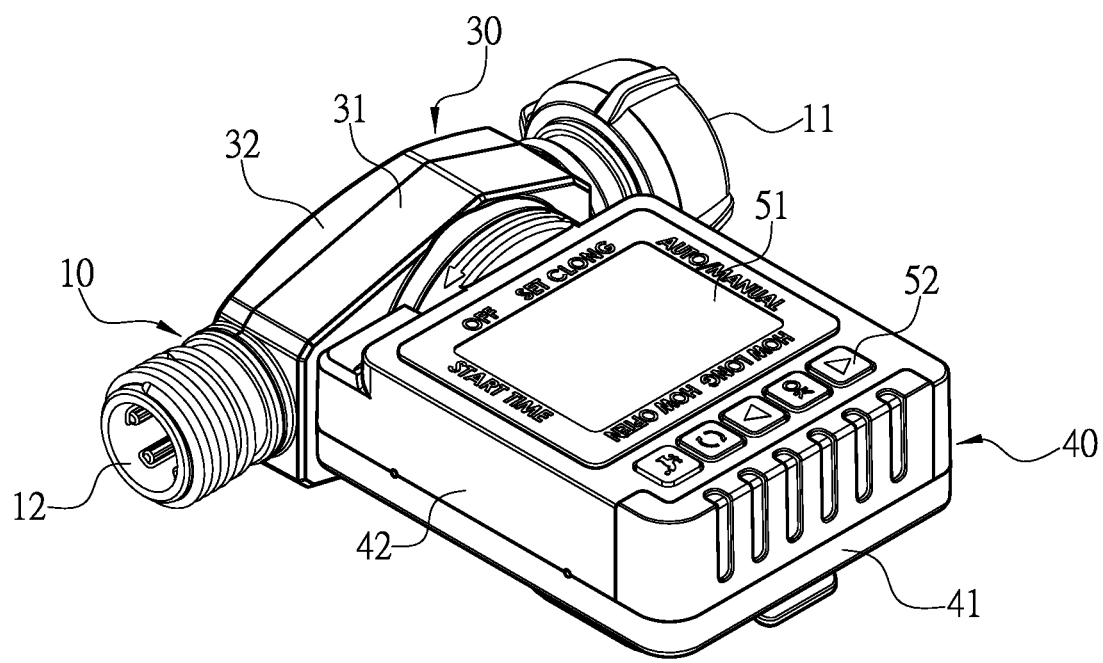
FIG. 1 is a three-dimensional assembly view of a digital water timer of the present invention.
Figure 2:
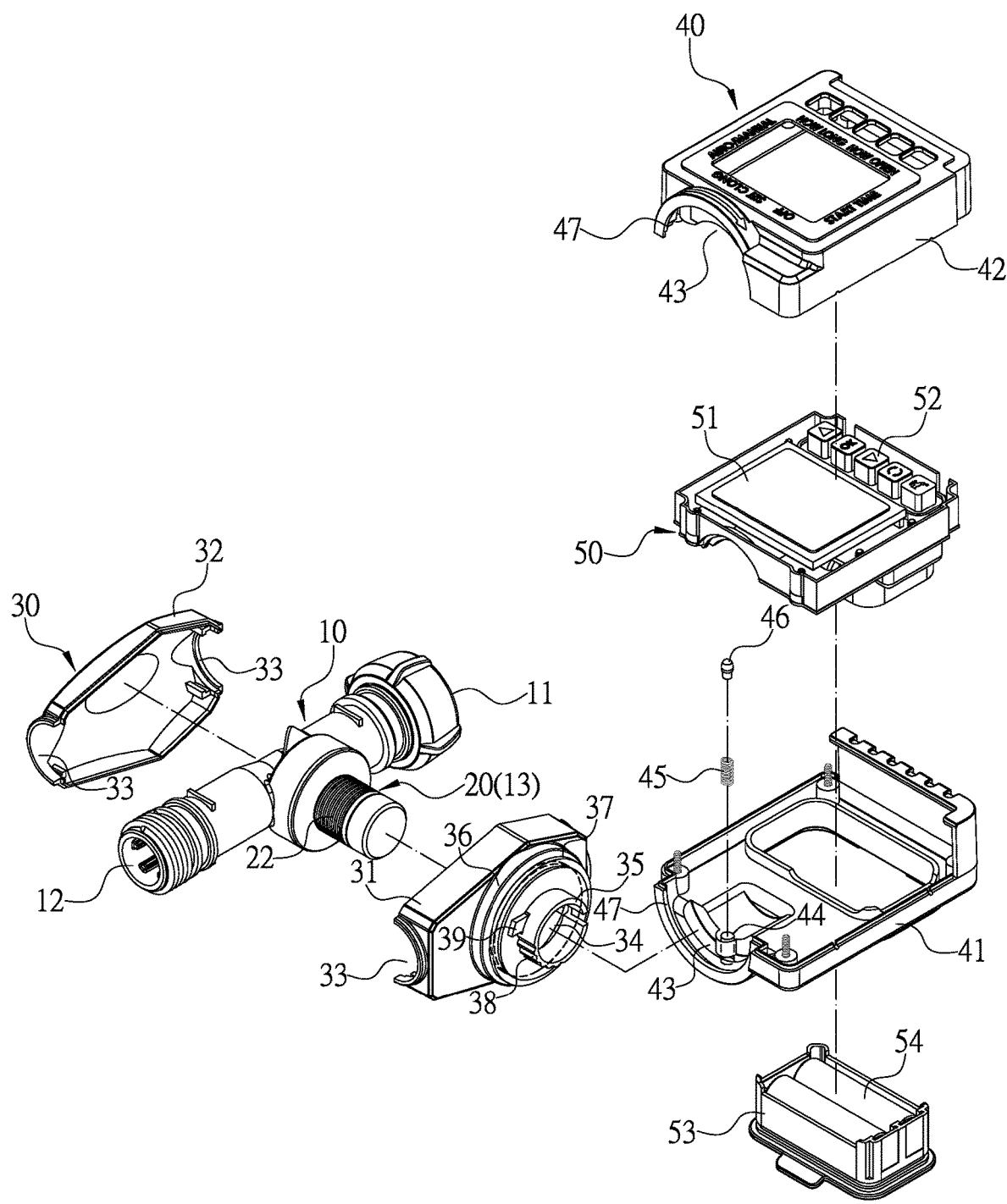
FIG. 2 is a three-dimensional exploded view of the digital water timer of the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 5, the present invention provides a digital water timer which comprises a main body (10), a water valve (20), a locating base (30), a driving base (40), and a timer (50). The main body (10) has a water inlet (11) and a water outlet (12) which are respectively connected to two water tube. A valve tube (13) protruding from a lateral side of the main body (10) is located between the water inlet (11) and the water outlet (12), and the water valve (20) is connected to the main body (10) through the valve tube (13). The water valve (20) is controlled by the timer (50) to achieve on/off operation of channels inside the main body (10). The locating base (30) is secured on the main body (10), and the water inlet (11), the water outlet (12) and the valve tube (13) are configured to protrude out of the locating base (30) respectively. The driving base (40) is pivotally connected to the locating base (30) at the position of the valve tube (13) such that the driving base (40) is adapted to have rotation relative to the locating base (30), and the driving base (40) is configured to be secured at a specific position after rotated. The timer (50) is installed in the driving base (40), and the timer (50) comprises a display panel (51) and an operation interface (52) which are exposed externally for operation. Moreover, the timer (50) is driven when the driving base (40) is rotated relative to the locating base (30), so that the display panel (51) is adapted to be adjusted as needed to provide an optimal view for operation.

Figure 3:
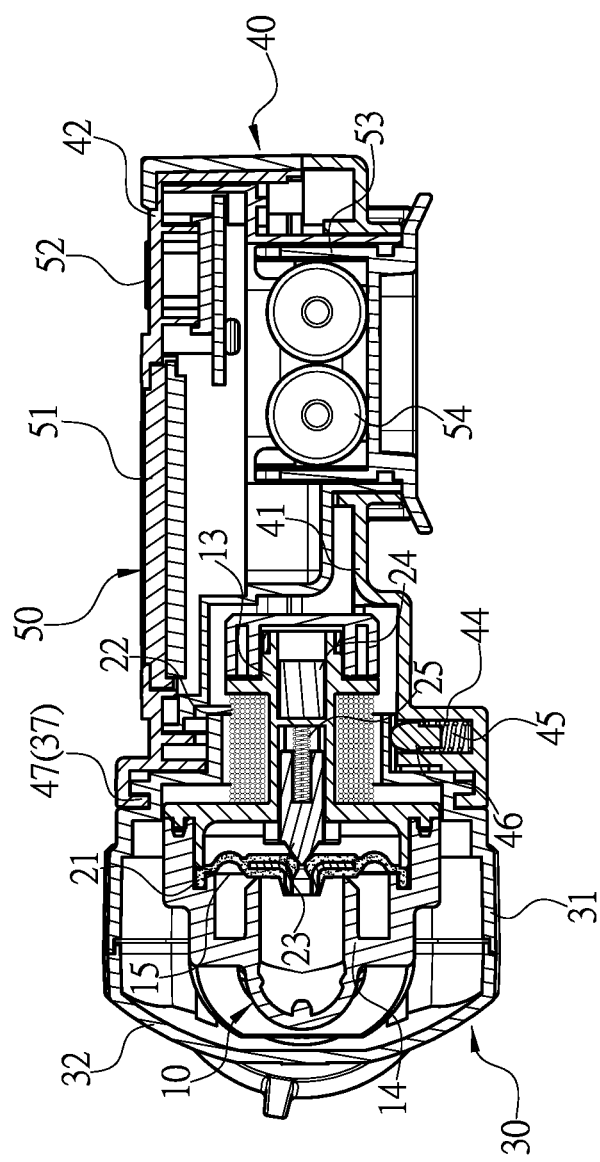
FIG. 3 is a first sectional view of the digital water timer of the present invention when a water valve thereof is turned off.
Figure 4:
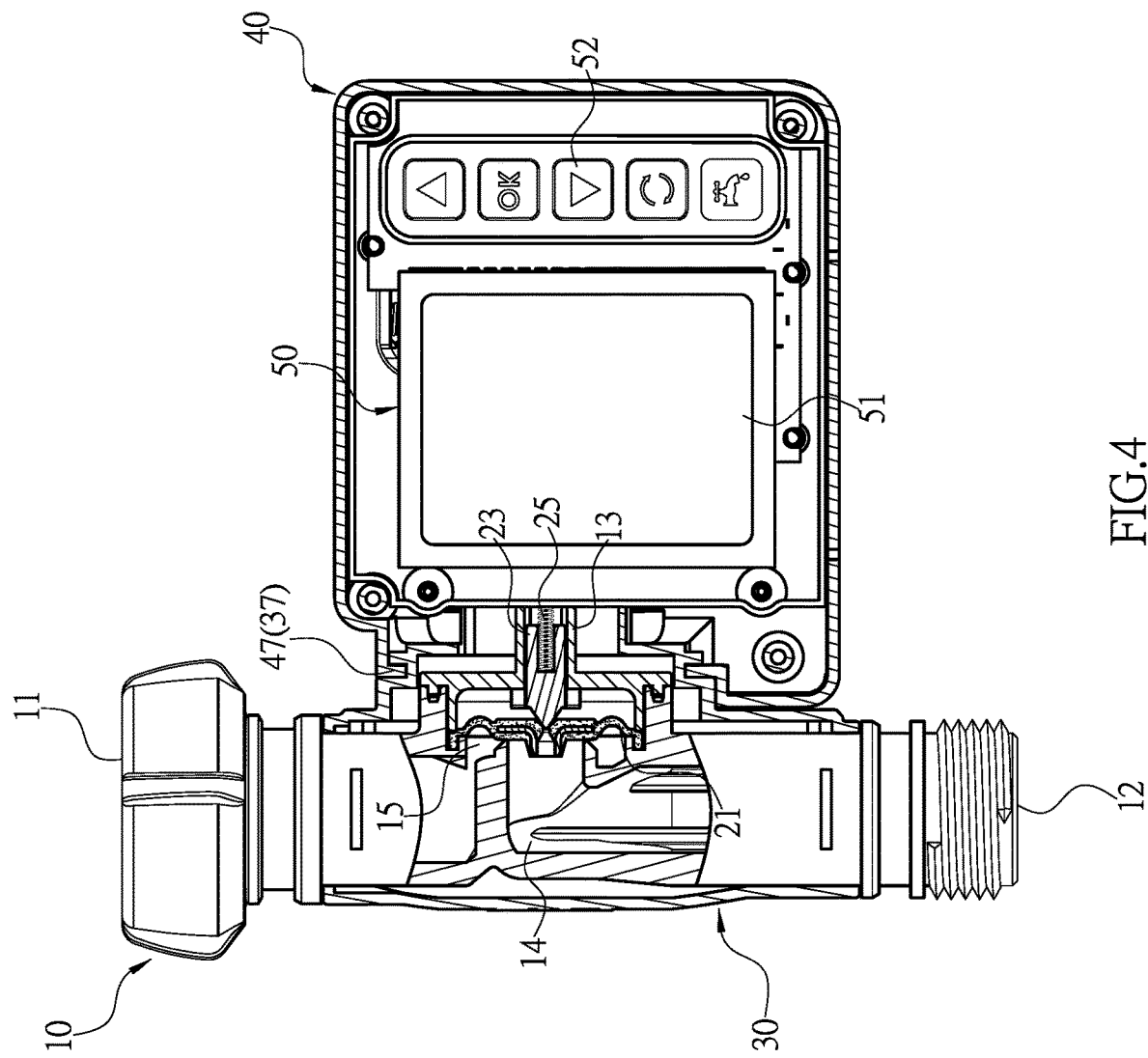
FIG. 4 is a second sectional view of the digital water timer of the present invention when the water valve thereof is turned off.
Figure 5:
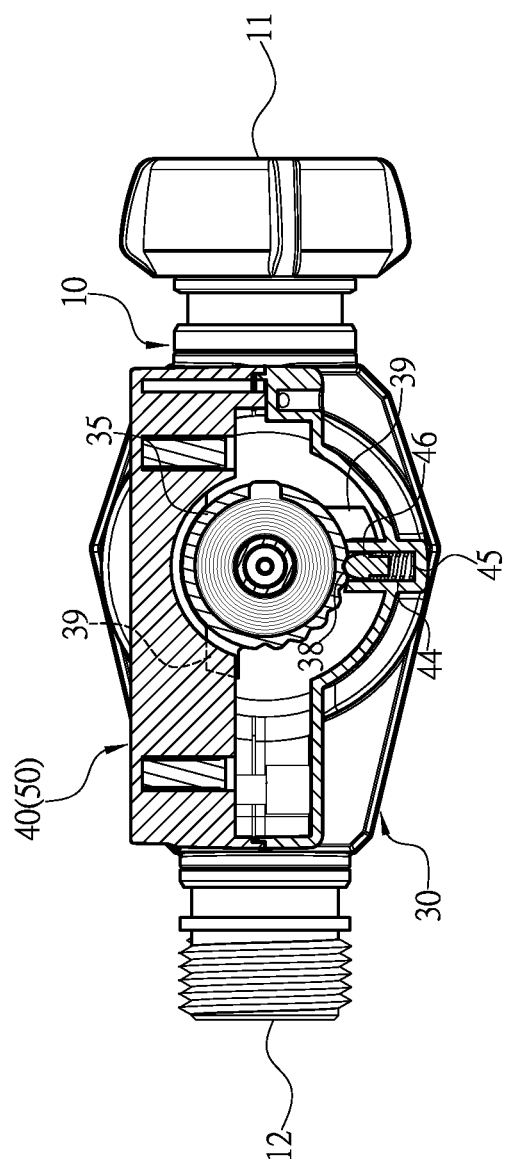
FIG. 5 is another sectional view of the digital water timer of the present invention.
Figure 6:
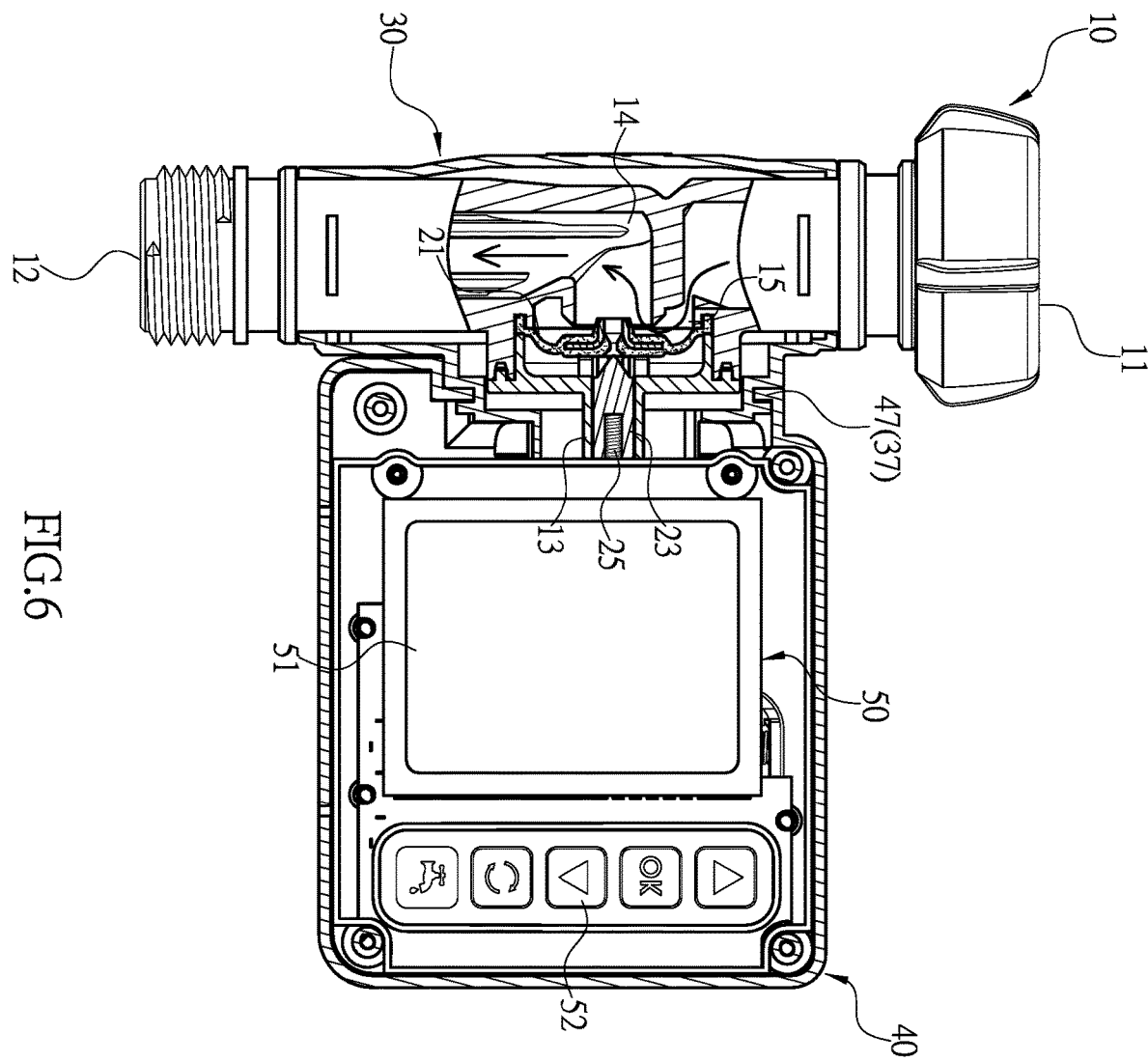
FIG. 6 is a schematic view illustrating water flows through a main body of the digital water timer of the present invention.

A first connecting tube (14) formed inside the main body (10) is located at a position axially aligned with the valve tube (13), and the first connecting tube (14) is communicated with the water inlet (11) through an annular channel (15) formed therebetween, and the first connecting tube (14) is directly communicated with the water outlet (12). The water valve (20) has a valve piece (21) which covers and is configured to control on/off operation of the first connecting tube (14) and the annular channel (15). Also, the water valve (20) comprises a solenoid coil (22) wound on an outer periphery of the valve tube (13), and the valve tube (13) has two spaces formed therein to respectively accommodate a valve column (23) and a magnetic member (24). Moreover, the valve column (23) is pressed by a first spring (25) to position toward the valve piece (21) at an initial position. Thus, in case that the water valve (20) needs to be turned off, the timer (50) is configured to energize the solenoid coil (22) to move the valve column (23) which is made of metal toward and against the valve piece (21). When the timer (50) stops energizing the solenoid coil (22), the first spring (25) is adapted to keep pushing the valve column (23) to bear against the valve piece (21) so as to keep the water valve (20) to be turned off without power consumption (as shown in FIGS. 3 and 4). On the other hand, in case that the water valve (20) needs to be turned on, the timer (50) is configured to energize the solenoid coil (22) to move the valve column (23) away from the valve piece (21) such that water is adapted to pass through the water inlet (11), the annular channel (15), the first connecting tube (14), and the water outlet (12) for water supply (as shown in FIG. 6). Then, when the timer (50) stops energizing the solenoid coil (22), the magnetic force of the magnetic member (24), which is greater than the elastic force of the first spring (25), is configured to keep the valve column (23) at a position away from the valve piece (21) so as to keep the water valve (20) to be turned on without power consumption.

The locating base (30) comprises a first case (31) and a second case (32) which are halves to fit together, and four first recesses (33) are respectively formed at two ends of the first case (31) and two ends of the second case (32). A through hole (34) penetrates through a center of the first case (31), and a second connecting tube (35) laterally protrudes from the center of the first case (31). The recesses (33), the through hole (34), and the second connecting tube (35) are adapted to provide space for dodge, and the first case (31) and the second case (32) are fitted together to couple around the main body (10), and the water inlet (11), the water outlet (12), and the valve tube (13) respectively protrude out of the locating base (30). The locating base (30) is secured on the main body (10), and the locating base (30) has a protruded base (36) to enable the through hole (34) and the second connecting tube (35) to be formed thereon, and an annular groove (37) is formed at an outer periphery of the protruded base (36). Moreover, a plurality of locating recesses (38) are formed on an outer wall of the second connecting tube (35).

Figure 7:
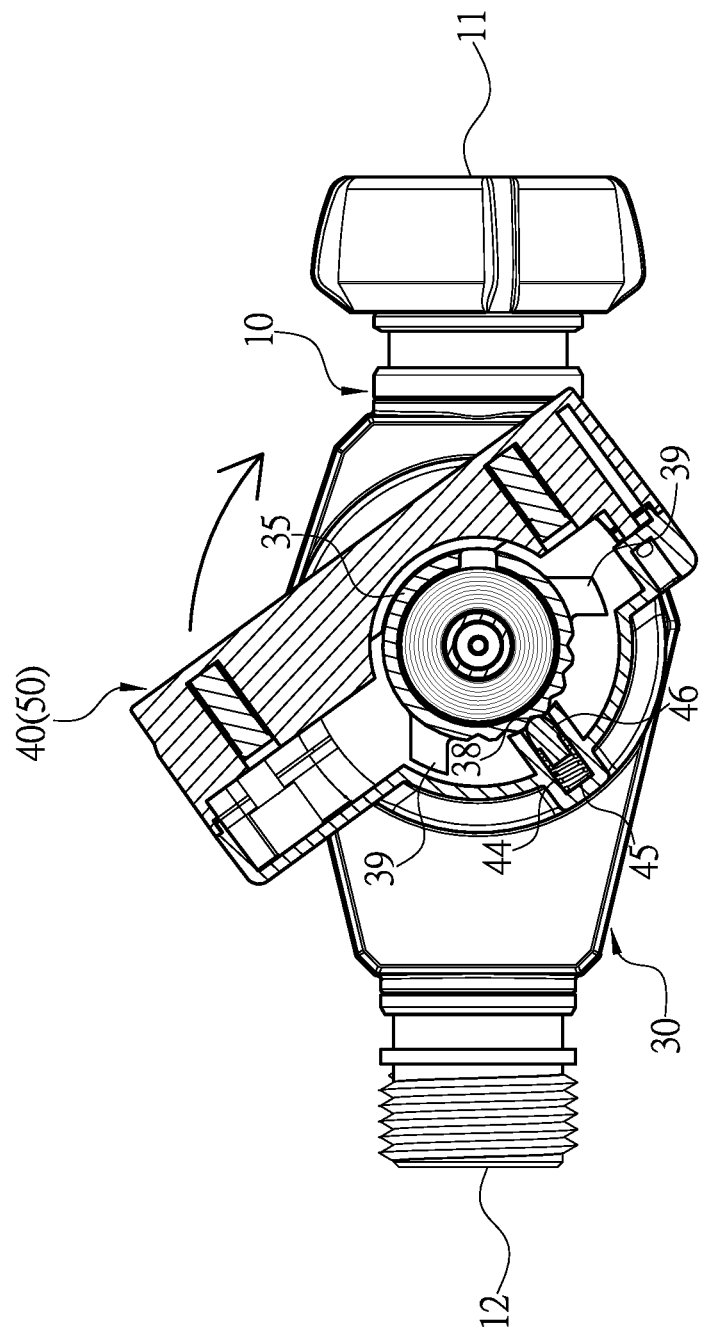
FIG. 7 is a schematic view illustrating a display panel of the digital water timer of the present invention is rotated and positioned.

The driving base (40) comprises a third case (41) and a fourth case (42) which are halves to fit together, and two connecting portions (43) are respectively formed at an end of the third case (41) and an end of the fourth case (42) which are located at corresponding positions. Furthermore, at least one of the two connecting portions (43) has a locating hole (44) formed therein, and a second spring (45) and a locating bolt (46) are respectively installed in the locating hole (44), and the second spring (45) is adapted to push the locating bolt (46) outwardly. In addition, each of the two connecting portions (43) has a hook-shaped engaging edge (47) such that when the second connecting tube (35) of the locating base (30) is inserted into the driving base (40) through the connecting portions (43), the engaging edges (47) of the connecting portions (43) are adapted to engage with the annular groove (37) so as to connect the locating base (30) with the driving base (40) at the position of the valve tube (13). Also, the locating bolt (46), which is pushed by the second spring (45), is coupled in one locating recess (38) at a corresponding position such that the driving base (40) is adapted to be secured at a specific position after rotated (as shown in FIG. 7).

In one embodiment, at least a locating board (39) protruding from the second connecting tube (35) is configured to limit the maximum rotating angle of the driving base (40) with the timer (50).

In another embodiment, the timer (50) has a battery case (53) to install a battery (54) therein so as to provide power to the timer (50) and the water valve (20).

In still another embodiment, the timer (50) is waterproof to avoid moisture in the air or water from infiltrating in the timer (50) causing failure or damage of the timer (50).

In a further embodiment, when the driving base (40) with the timer (50) is rotated to a vertical angle, a user is configured to pat the dust off the display panel (51) so as to keep the display panel (51) clean.

Figure 8:
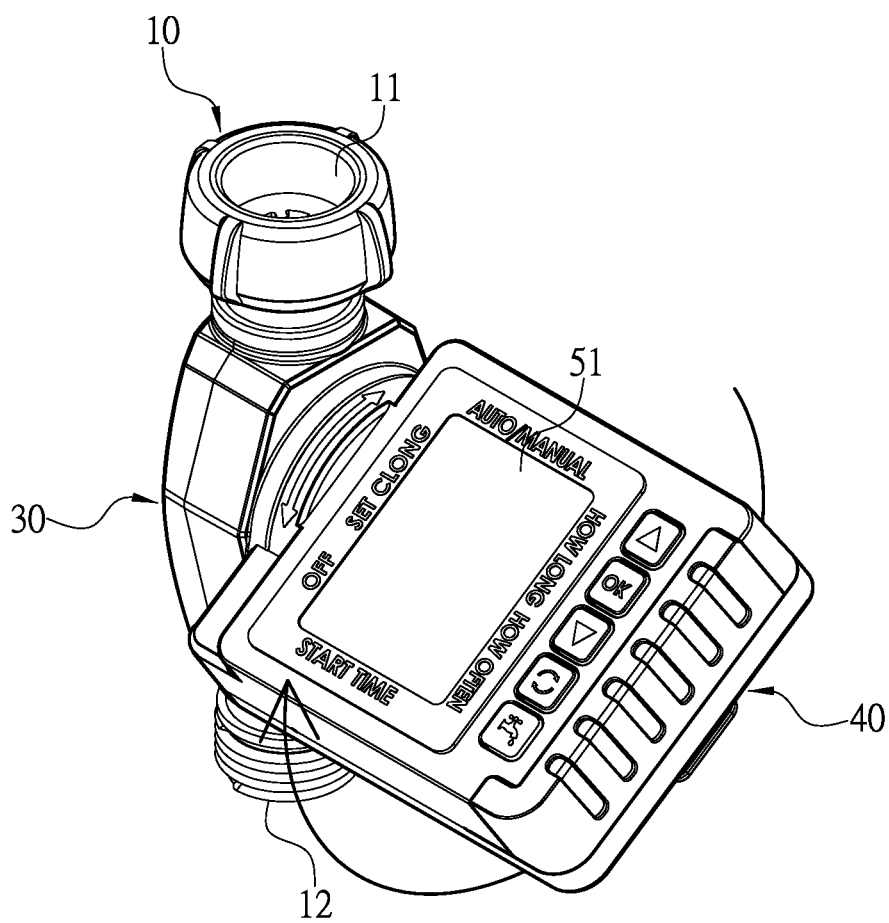
FIG. 8 is a schematic view illustrating the display panel is rotated to a position having an optimal view for operation when the main body of the digital water timer is positioned vertically.
Figure 9:
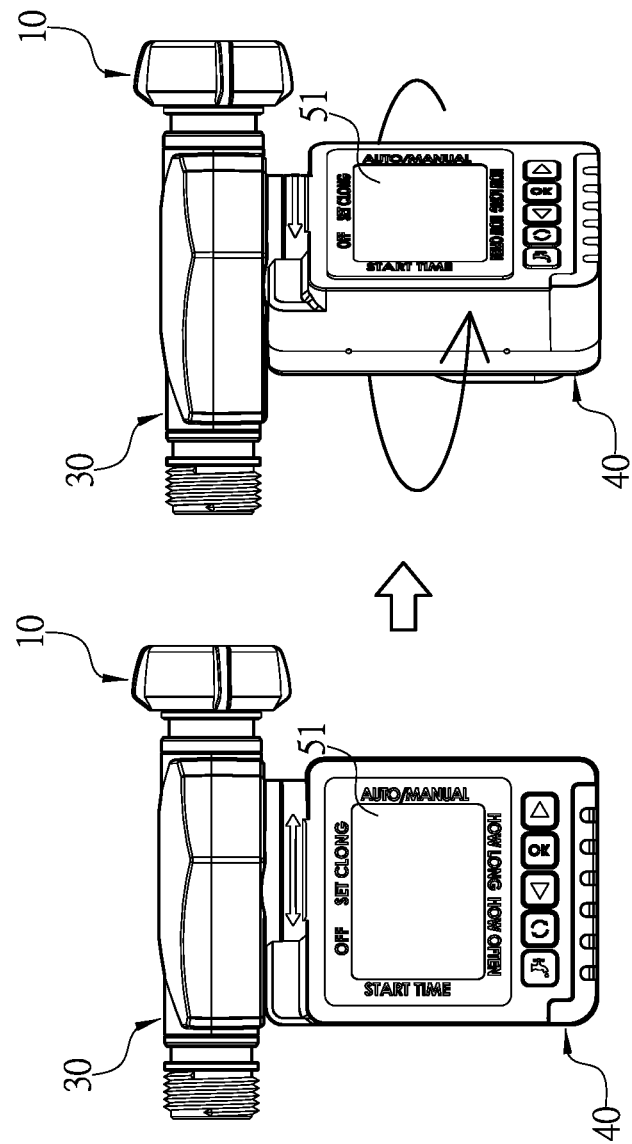
FIG. 9 is a schematic view illustrating the display panel is rotated to a position having an optimal view for operation when the main body of the digital water timer is positioned horizontally.
Figure 10:
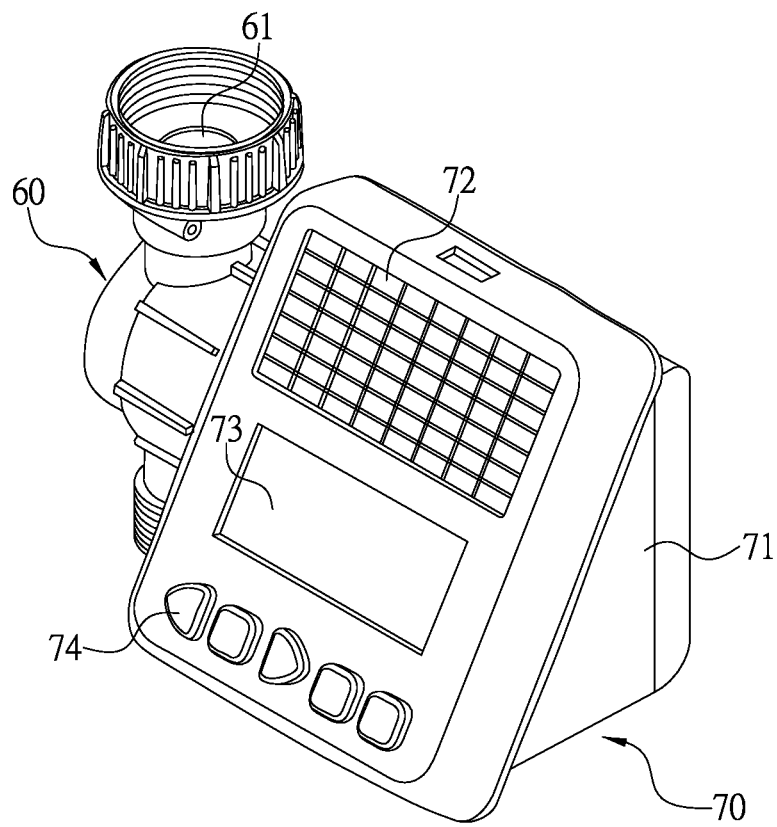
FIG. 10 is a prior art.
Figure 11:
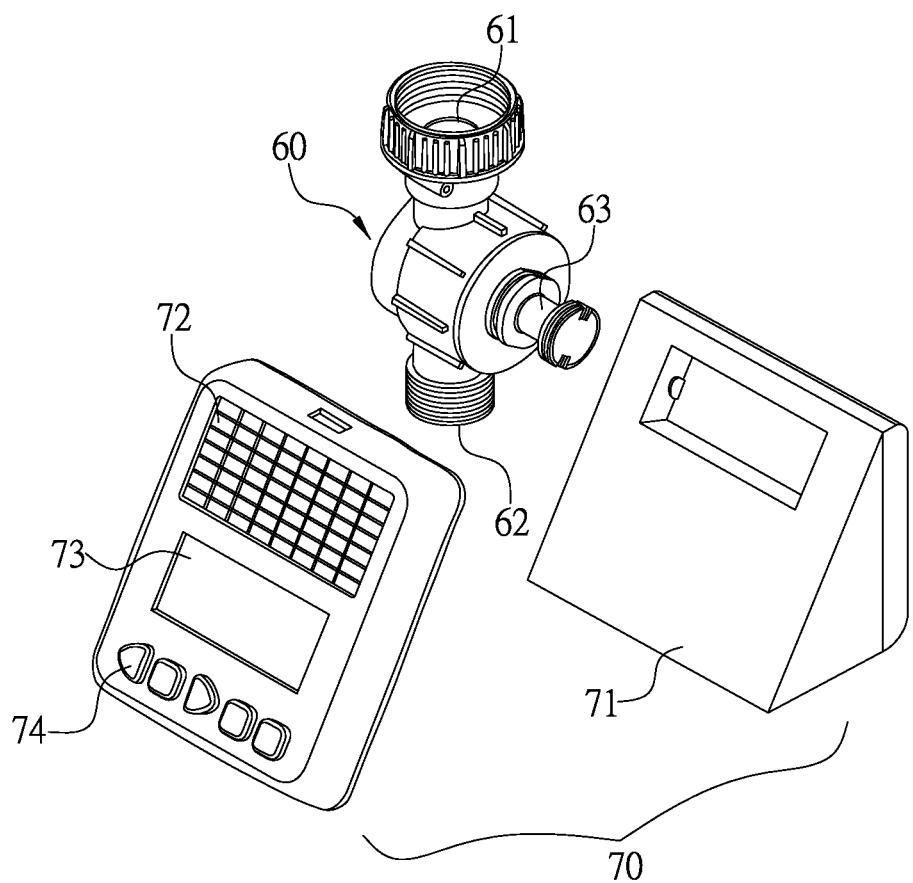
FIG. 11 is a prior art.

Comparing with conventional water timer, the present invention is advantageous because: (i) the driving base (40) together with the timer (50) and the display panel (51) can be pivotally rotated relative to the locating base (30) and secured at a position having an optimal view for operation, which enables the display panel (51) to be used as needed under different conditions; (ii) the timer (50) can be rotated to a vertical angle to enable a user to pat the dust off the display panel (51) easily; and (iii) the driving base (40) with the display panel (51) can be adjusted to a position having an optimal view for operation both when the main body (10)

is positioned vertically (as shown in FIG. 8) and when the main body (10) is positioned horizontally (as shown in FIG. 9).

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A digital water timer comprising a main body, a water valve, a locating base, a driving base, and a timer;
   wherein the main body has a water inlet and a water outlet, and a valve tube protruding from a lateral side of the main body is located between the water inlet and the water outlet, and the water valve is connected to the main body through the valve tube; the water valve is controlled by the timer to achieve on/off operation of channels inside the main body;
   wherein the locating base is secured on the main body, and the water inlet, the water outlet and the valve tube are configured to protrude out of the locating base respectively; wherein the driving base is pivotally connected to the locating base at the position of the valve tube, and the driving base is adapted to have rotation relative to the locating base and be secured at a specific position after rotated; and
   wherein the timer installed in the driving base comprises a display panel and an operation interface which are exposed externally for operation; the timer is driven when the driving base is rotated relative to the locating base, so that the display panel is adapted to be adjusted as needed to provide an optimal view for operation.

2. The digital water timer of claim 1, wherein a first connecting tube formed inside the main body is located at a position axially aligned with the valve tube, and the first connecting tube is communicated with the water inlet through an annular channel formed therebetween, and the first connecting tube is directly communicated with the water outlet; the water valve has a valve piece which covers the first connecting tube and the annular channel; the water valve comprises a solenoid coil wound on an outer periphery of the valve tube, and the valve tube has two spaces formed therein to respectively accommodate a valve column and a magnetic member; the valve column is pressed by a first spring to position toward the valve piece at an initial position; when the water valve needs to be turned on, the timer is configured to energize the solenoid coil to move the valve column which is made of metal toward and against the valve piece, and when the timer stops energizing the solenoid coil, the first spring is adapted to keep pushing the valve column to bear against the valve piece so as to keep the water valve to be turned off without power consumption; when the water valve needs to be turned on, the timer is configured to energize the solenoid coil to move the valve column away from the valve piece such that water is adapted to pass through the water inlet, the annular channel, the first connecting tube, and the water outlet for water supply, and when the timer stops energizing the solenoid coil, the magnetic force of the magnetic member, which is greater than the elastic force of the first spring, is configured to keep the valve column at a position away from the valve piece so as to keep the water valve to be turned on without power consumption.

3. The digital water timer of claim 1, wherein the locating base comprises a first case and a second case which are halves to fit together, and four first recesses are respectively formed at two ends of the first case and two ends of the second case; a through hole penetrates through a center of the first case, and a second connecting tube laterally protrudes from the center of the first case; the four first recesses, the through hole, and the second connecting tube are adapted to provide space for dodge, and the first case and the second case are fitted together to couple around the main body, and the water inlet, the water outlet, and the valve tube respectively protrude out of the locating base; the locating base is secured on the main body, and the locating base has a protruded base to enable the through hole and the second connecting tube to be formed thereon, and an annular groove is formed at an outer periphery of the protruded base; a plurality of locating recesses are formed on an outer wall of the second connecting tube; the driving base comprises a third case and a fourth case which are halves to fit together, and two connecting portions are respectively formed at an end of the third case and an end of the fourth case which are located at corresponding positions; at least one of the two connecting portions has a locating hole formed therein, and a second spring and a locating bolt are respectively installed in the locating hole, and the second spring is adapted to push the locating bolt outwardly; each of the two connecting portions has a hook-shaped engaging edge such that when the second connecting tube of the locating base is inserted into the driving base through the two connecting portions, the hook shaped engaging edges of the two connecting portions are adapted to engage with the annular groove so as to connect the locating base with the driving base at the position of the valve tube; the locating bolt, which is pushed by the second spring, is coupled in one locating recess at a corresponding position such that the driving base is adapted to be secured at a specific position after rotated.

4. The digital water timer of claim 3, wherein at least a locating board protrudes from the second connecting tube.

5. The digital water timer of claim 1, wherein the timer has a battery case to install a battery therein so as to provide power to the timer and the water valve.

6. The digital water timer of claim 1, wherein the timer is waterproof to avoid moisture in the air or water from infiltrating in the timer so as to cause failure or damage of the timer.

7. The digital water timer of claim 1, wherein when the driving base with the timer is rotated to a specific angle, a user is configured to pat dust off the display panel so as to keep the display panel clean.

* * * * *